US012700089B2

(12) United States Patent
Li et al.

(10) Patent No.: US 12,700,089 B2
(45) Date of Patent: Aug. 4, 2026

(54) MEDICAL IMAGE PROCESSING APPARATUS AND MEDICAL IMAGE PROCESSING METHOD

(71) Applicant: Canon Kabushiki Kaisha, Tokyo (JP)

(72) Inventors: Gengwan Li, Beijing (CN); Lixin Yan, Beijing (CN); Qilin Xiao, Beijing (CN); Shun Zhao, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 292 days.

(21) Appl. No.: 18/459,816

(22) Filed: Sep. 1, 2023

(65) Prior Publication Data

US 2024/0087118 A1 Mar. 14, 2024

(30) Foreign Application Priority Data

Sep. 1, 2022 (CN) .......................... 202211064502.1
Jun. 9, 2023 (JP) ................................ 2023-095834

(51) Int. Cl.
*G06K 9/00* (2022.01)
*G06T 7/00* (2017.01)
(Continued)

(52) U.S. Cl.
CPC ............ *G06T 7/0012* (2013.01); *G06V 10/25* (2022.01); *G06V 10/44* (2022.01); *G06T 2207/20081* (2013.01); *G06V 2201/07* (2022.01)

(58) Field of Classification Search
None
See application file for complete search history.

(56) References Cited

U.S. PATENT DOCUMENTS

2019/0057515 A1*  2/2019  Teixeira .................  A61B 6/488
2022/0189009 A1*  6/2022  Wang .......................  G06F 18/24
2023/0111306 A1*  4/2023  Anand ..................  G06T 7/0014
                                                                           382/128

FOREIGN PATENT DOCUMENTS

CN        114119484 A      3/2022
CN        114596304 A      6/2022
(Continued)

OTHER PUBLICATIONS

Chinese Office Action dated Mar. 25, 2026, issued in Chinese Patent Application No. 202211064502.1 (with English translation).

*Primary Examiner* — Wei Wen Yang
(74) *Attorney, Agent, or Firm* — Oblon, McClelland, Maier & Neustadt, L.L.P.

(57) ABSTRACT

A medical image processing apparatus according to one embodiment includes processing circuitry. The processing circuitry trains an attention model by using a medical image and a mask image that is obtained by performing mask processing on a region other than a region of interest in the medical image, trains an image processing model by using the medical image, a heatmap corresponding to the medical image, and an attention feature that indicates attention of the region of interest in the trained attention model, combines, as an attention image processing model, an attention extraction module that includes an attention module for outputting the attention feature and the trained image processing model, performs processing on the medical image by using the attention image processing model, and generates a heatmap for determining a position of a landmark in the medical image.

7 Claims, 6 Drawing Sheets

(51) Int. Cl.
  *G06V 10/25* (2022.01)
  *G06V 10/44* (2022.01)

(56) References Cited

FOREIGN PATENT DOCUMENTS

| | | | | | |
|---|---|---|---|---|---|
| CN | 114998292 A | * | 9/2022 | ............... | G06T 7/11 |
| JP | 2019-115487 A | | 7/2019 | | |

* cited by examiner

MEDICAL IMAGE PROCESSING APPARATUS AND MEDICAL IMAGE PROCESSING METHOD

CROSS-REFERENCE TO RELATED APPLICATIONS

This application is based upon and claims the benefit of priority from Chinese Patent Application No. 202211064502.1, filed on Sep. 1, 2022; and Japanese Patent Application No. 2023-095834, filed on Jun. 9, 2023, the entire contents of all of which are incorporated herein by reference.

FIELD

Embodiments disclosed in the present application relates to a medical image processing apparatus and a medical image processing method.

BACKGROUND

As a method for detecting a landmark in a medical image, for example, a heatmap regression prediction method based on deep learning is known. As one example, in a training stage, a heatmap is generated by using landmark coordinates, and a neural network is trained based on the heatmap. Further, a heatmap corresponding to a landmark in a medical image is generated by using the trained neural network.

However, the heatmap regression prediction based on the deep learning as described above has a problem in that, for example, a medical image from which a landmark is to be detected may include a plurality of organs and tissue that have similar local features, and in this case, it may be difficult for a prediction network based on deep learning to accurately construct a relationship between an organ and tissue region and a landmark.

DETAILED DESCRIPTION

A medical image processing apparatus according to one embodiment includes processing circuitry. The processing circuitry is configured to train an attention model by using a medical image and a mask image that is obtained by performing mask processing on a region other than a region of interest in the medical image, train an image processing model by using the medical image, a heatmap corresponding to the medical image, and an attention feature that indicates attention of the region of interest in the trained attention model, combine, as an attention image processing model, an attention extraction module that includes an attention module for outputting the attention feature and the trained image processing model, perform processing on the medical image by using the attention image processing model, and generate a heatmap for determining a position of a landmark in the medical image.

Embodiments of a medical image processing apparatus will be described in detail below with reference to the drawings.

The medical image processing apparatus according to the present embodiment is configured with a plurality of functional modules and may be implemented by being installed in a device, such as a computer, that is independent as software and that includes a central processing unit (CPU) and a memory or by being installed in a plurality of devices in a distributed manner, and causing a certain processor to execute each of the functional modules of the medical image processing apparatus, where the modules are stored in the memory. The medical image processing apparatus may be implemented by a hardware system as circuitry that is able to execute each of functions. The circuitry that implements the medical image processing apparatus is able to transmit and receive data or capture an image of data via a network, such as the Internet. Further, the medical image processing apparatus according to the present embodiment may be directly installed in a medical image capturing apparatus.

First Embodiment

Figure 1:
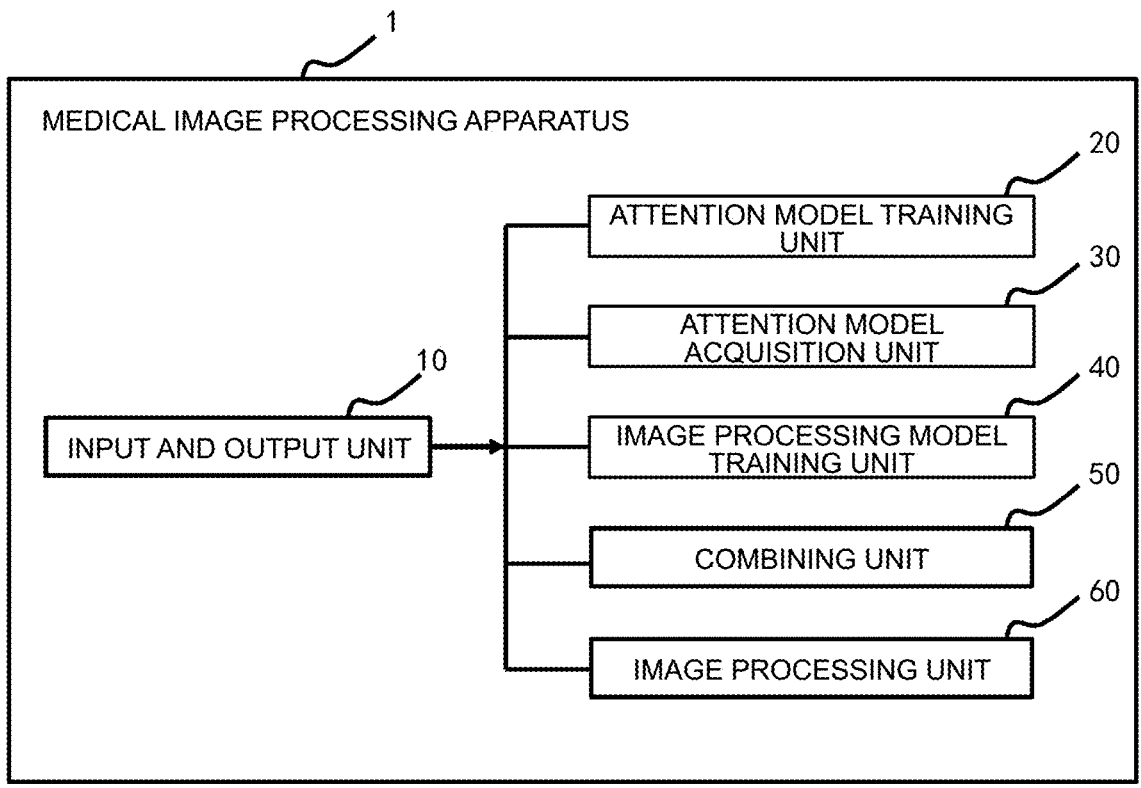
FIG. 1 is a block diagram illustrating an example of a functional configuration of a medical image processing apparatus according to a first embodiment.
Figure 2:
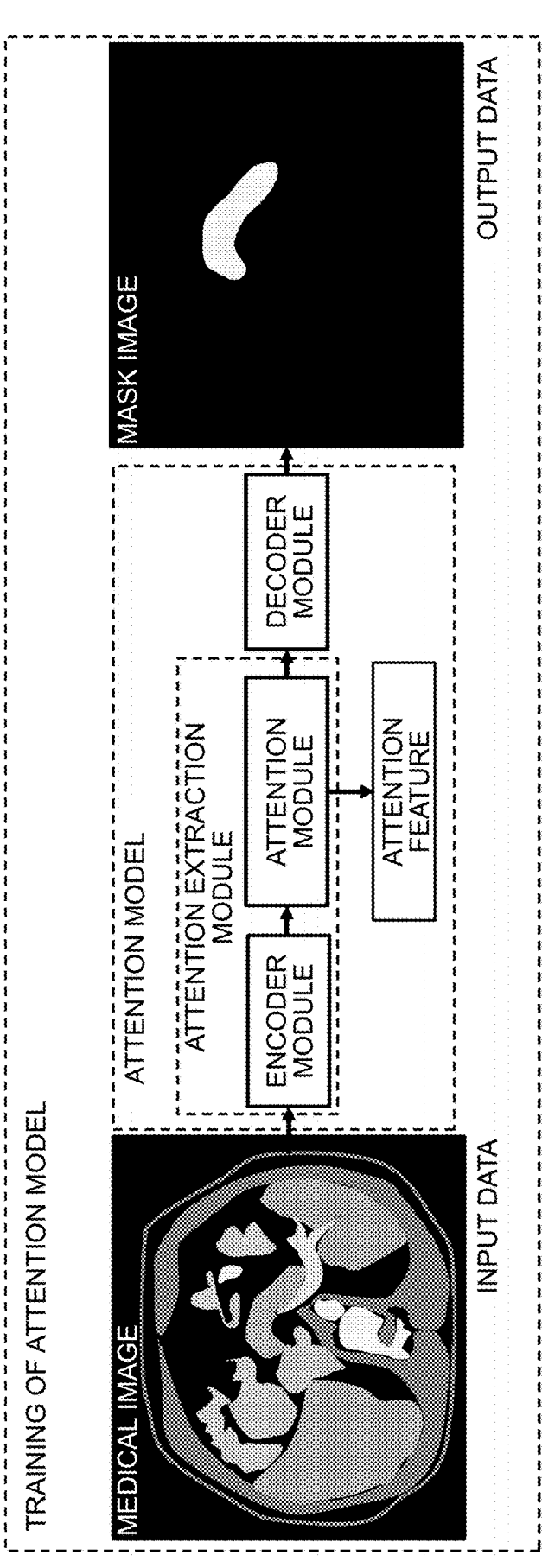
FIG. 2 is a schematic diagram illustrating training of an attention model according to the first embodiment.
Figure 3:
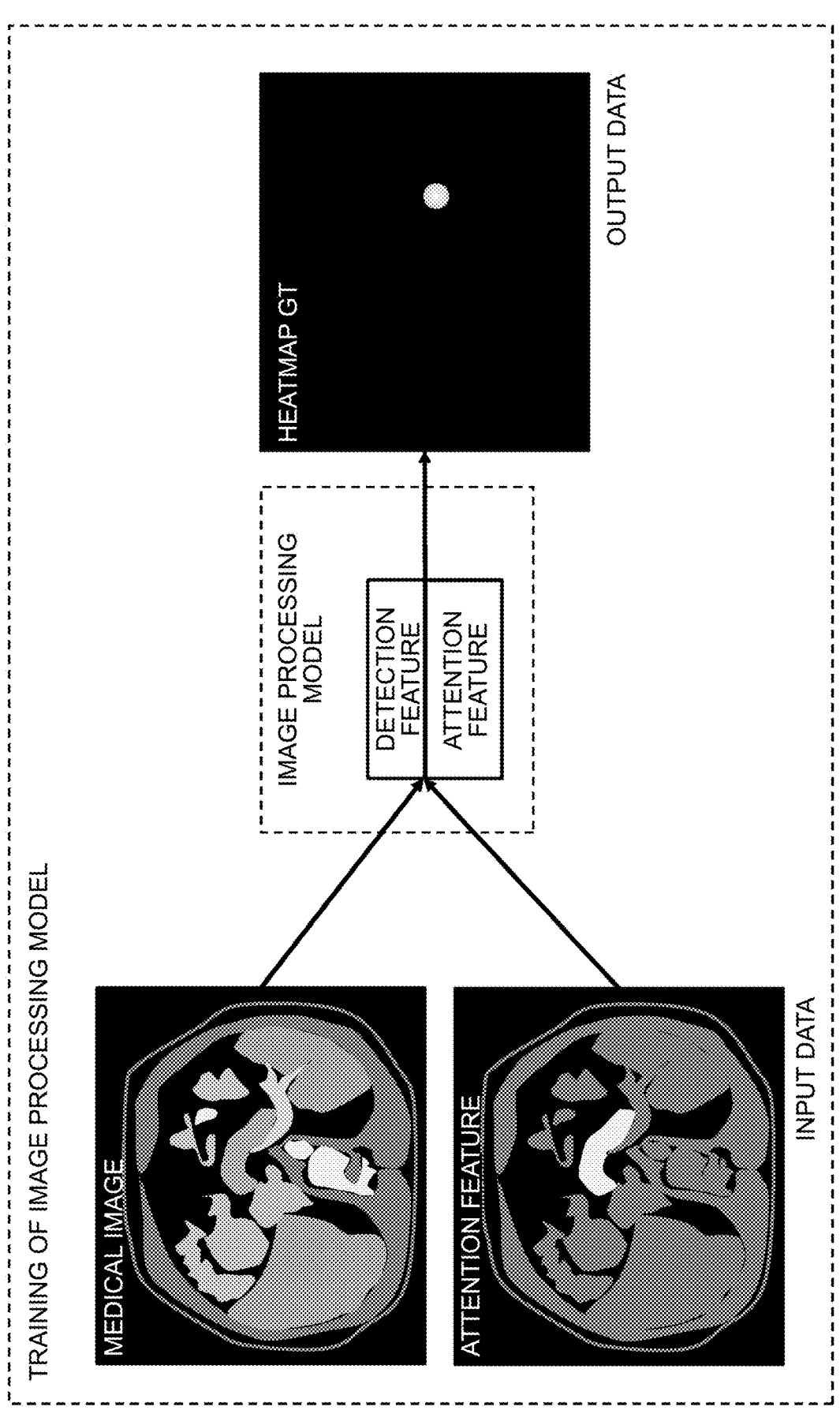
FIG. 3 is a schematic diagram illustrating training of an image processing model according to the first embodiment.
Figure 4:
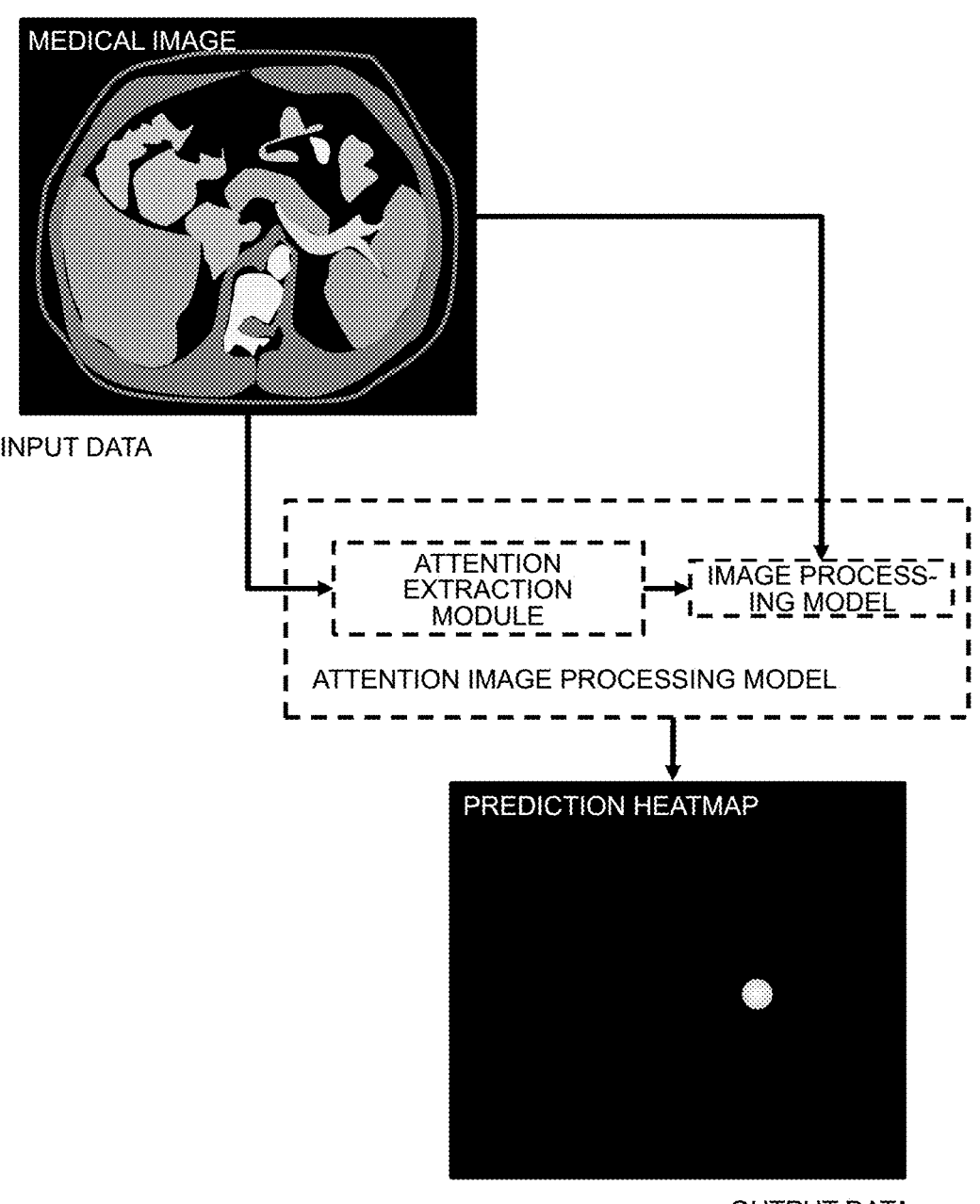
FIG. 4 is a schematic diagram illustrating an attention image processing model according to the first embodiment.

A first embodiment will be described below with reference to FIG. 1 to FIG. 4. FIG. 1 is a block diagram illustrating an example of a configuration of a medical image processing apparatus according to the first embodiment. FIG. 2 is a schematic diagram illustrating training of an attention model according to the first embodiment. FIG. 3 is a schematic diagram illustrating training according to an image processing model of the first embodiment. FIG. 4 is a schematic diagram illustrating an attention image processing model according to the first embodiment.

Further, in the description below, the medical image processing apparatus and a medical image processing method of the present invention are explained by using an example in which a landmark corresponding to a pancreatic tail in a medical image in which a pancreas is captured is to be detected. In other words, in the description below, a landmark position corresponding to the pancreatic tail in the medical image in which the pancreas is captured as a target is to be detected. However, the present embodiment is not limited to this example, and may be applied to a process of detecting a landmark in a different medical image, a different site, a different organ, or different tissue.

As illustrated in FIG. 1, a medical image processing apparatus 1 of the first embodiment includes an input and output unit 10, an attention model training unit 20, an attention acquisition unit 30, an image processing model training unit 40, a combining unit 50, and an image processing unit 60.

Among the units as described above, the input and output unit 10 acquires a medical image of a subject, which is input from outside. In this example, the acquired medical image includes a medical image that serves as training data (a medical image that is used in a training flow) and a medical image to be subjected to image processing, for example, a medical image for which a landmark position is to be detected (a medical image that is used in a processing flow).

The attention model training unit 20 trains an attention model by using a medical image and a mask image. Specifically, in the training flow, the attention model training unit 20 trains the attention model based on a deep neural network that includes an attention mechanism. The deep neural network that includes the attention mechanism further includes three modules, that is, an encoder module, an attention module, and a decoder module. The encoder module encodes an input sequence in the deep neural network and acquires a set of encoded vectors with fixed lengths. Further, the attention module outputs an attention feature. The attention feature indicates attention corresponding to each of positions in the medical image, in other words, a degree (weight) of interest of each of the position at the time of processing on the medical image.

Furthermore, the decoder module outputs an output sequence that is acquired by reading each of the encoded vectors. In the deep neural network that includes the attention mechanism, the attention module adopts the trained weight of interest of each of the positions as input of the decoder module. With this configuration, while the decoder module is operating, it is possible to make a circuit of the entire input sequence and pays attention to a specific position in the input sequence. In the following, a combination of the encoder module and the attention module will also be referred to as an attention extraction module.

As illustrated in FIG. 2, when the attention model is trained based on the deep neural network that includes the attention mechanism, the medical image is adopted as input data in a training data set and a mask image that is obtained by performing mask processing on the medical image is adopted as output data in the training data set.

Meanwhile, the mask image is an image that is obtained by performing the mask processing on a region other than a region of interest in the medical image. The region of interest is a region that is related to a landmark to be detected in the medical image. For example, in the example illustrated in FIG. 2, if a landmark position corresponding to a pancreatic tail is to be detected in a medical image in which a pancreas is captured, the region of interest is the pancreas. In this case, the mask image is generated by performing the mask processing on a region other than the pancreas in the medical image in which the pancreas is captured. In the mask image, the region other than the pancreas is shielded and only the region of the pancreas is displayed. At this time, "attention" is focused on the region and a position of the pancreatic tail as a landmark is detected.

The attention acquisition unit 30 acquires an attention feature, the attention module, and an attention extraction module in the trained attention model. Further, the acquired attention feature is adopted as attention that corresponds to the region of interest in the medical image.

In this example, the attention feature in the trained attention model is information that indicates a distribution of attention in the medical image, and a schematic diagram of the attention feature is illustrated in, for example, FIG. 3.

Meanwhile, the attention module in the trained attention model is a portion other than the encoder module and the decoder module in the attention model, and is able to automatically learn an attention weight and capture relevance between the encoder module and the decoder module. A schematic diagram of the attention feature is illustrated in, for example, FIG. 3.

Meanwhile, the attention extraction module in the trained attention model includes the encoder module and the attention module of the attention model.

The image processing model training unit 40 trains the image processing model by using the medical image, a heatmap corresponding to the medical image, and the attention feature in the trained attention model.

Specifically, in the training flow, as illustrated in FIG. 3, the heatmap corresponding to the medical image is a heatmap that indicates a landmark position in the medical image. In the medical image of the training data set, a heatmap is generated as a true value with respect to the landmark position. In this case, a value of the landmark position in the generated heatmap is the highest, values at remaining positions are low, and a value of each of pixels in the heatmap indicates a probability that a located position of the pixel serves as a landmark. For example, in the example illustrated in FIG. 3, if the landmark position corresponding to the pancreatic tail is to be detected in the medical image in which the pancreas is captured, a heatmap true value (GT) (heatmap GT) is generated such that a value of the landmark corresponding to the pancreatic tail is set to the highest and values at the other positions are set to low.

Further, the image processing model is trained by adopting the medical image in the training data set and the attention feature at each resolution in the trained attention model as input data, concatenating the attention feature at each resolution with a corresponding detection feature of the image processing model, and adopting the heatmap GT of the landmark position in the medical image as output data.

Here, concatenation of the attention feature at each resolution and the corresponding detection feature of the image processing model is to perform a combination process of the attention feature and the detection feature in accordance with a different channel. Accordingly, the image processing model training unit 40 trains the image processing model.

The combining unit 50 combines, as an attention image processing model, the attention extraction module in the trained attention model and the trained image processing model.

Specifically, in the training flow, as illustrated in FIG. 4, the combining unit 50 generates an attention image processing model by combining the attention extraction module in the trained attention model of the attention acquisition unit 30 and the trained image processing model. When combining the models, the combining unit 50 generates the attention image processing model by connecting the attention extraction module in the trained attention model and a corresponding feature layer in the trained image processing model. Here, the attention extraction module is a combination of the encoder module and the attention module in the trained attention model.

The image processing unit 60 performs processing on the medical image by using the attention image processing model. Specifically, in the example described in the first embodiment, the attention image processing model is used to detect the landmark portion in the medical image. In other words, in the processing flow, the image processing unit 60 detects a landmark in the medical image by using the attention image processing model. In this case, the medical image in which the landmark position is to be detected is input, as the input data, to the attention image processing model, and the attention image processing model generates a heatmap (prediction heatmap) that indicates a probability of the landmark position in the medical image. At this time, a position at which a pixel with the highest value in the generated heatmap has the highest probability that the position is the landmark position, and this position is determined as the landmark position. With this configuration, the landmark position corresponding to the pancreatic tail is extracted in the medical image in which the pancreas is captured.

According to the medical image processing apparatus of the present embodiment, the attention model and the image processing model are generated by training. An attention mechanism is used in the attention model, so that it is possible to focus an output result on a specific region (region of interest) in the medical image. Thereafter, the image processing model is trained by using the attention feature that represents attention corresponding to the region of interest in the trained attention model. Therefore, in the training flow, the image processing model performs detection while paying attention to the region of interest with high attention, and reduce detection in other regions with low attention. Further, after training of each of the attention model and the image processing model is completed, the attention extraction module in the trained attention model and the image processing model are combined to generate the attention image processing model, and the landmark position in the medical image is detected based on the attention image processing model.

With this configuration, when the landmark position in the medical image is to be detected by using the attention image processing model, the attention mechanism is used, and, in the detection flow of the landmark position, the attention image processing model pays more attention to the region of interest with high attention and detects the landmark position in the region of interest. Further, the attention image processing model does not pay attention to regions with low attention, other than the region of interest, and reduces detection in the regions with low attention.

Therefore, when the medical image includes a plurality of organs and tissue whose local features are similar to each other, detection in regions other than the region of interest is reduced, so that it is possible to improve detection accuracy of the landmark position in the medical image while reducing detection of the landmark in interfering organs and tissue.

Furthermore, if the feature of the landmark is not clarified or a structural change frequently occurs, a detection range the attention image processing model is reduced while focusing a detection region on the region of interest with high attention, so that the feature of the landmark becomes remarkable in the region with high attention, a degree of detection difficulty in the landmark position is reduced, detection accuracy of the landmark position in the medical images can be improved, and the attention image processing model is further lightened.

Moreover, the attention feature itself in the trained attention model has anatomical significance, and therefore has a practical value as the output data. At the same time, the attention feature may be used for other kinds of tasks, such as detection, positioning, division, and measurement, in the same region of interest, so that it is possible to improve operation efficiency of the medical image processing.

Meanwhile, in the example described in the first embodiment, the image processing indicates detection of the landmark position in the medical image. However, the image processing may be different processing on the medical image, and may be, for example, processing, such as positioning, division, and measurement, on tissue or an organ in the medical image.

Figure 5:
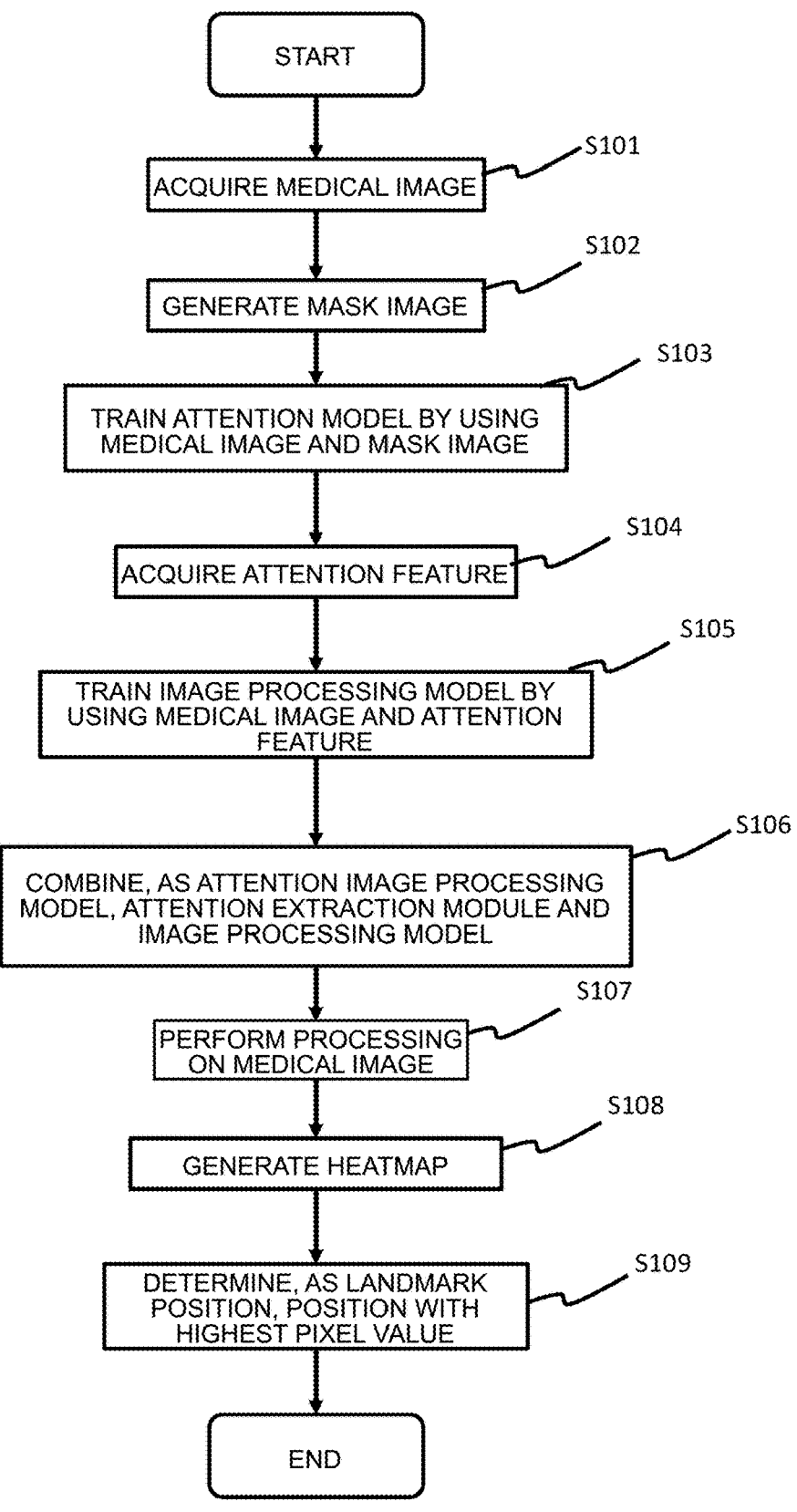
FIG. 5 is a flowchart illustrating medical image processing according to the first embodiment.

A flowchart of the first embodiment of the present application will be described below with reference to FIG. 5. FIG. 5 is a flowchart of medical image processing according to the first embodiment. The flowchart illustrated in FIG. 5 includes Step S101 to Step S106 as the training flow and Step S107 to Step S109 as the processing flow.

As illustrated in FIG. 5, first, process control goes to the training flow, in which at Step S101, the input and output unit 10 acquires a medical image of a subject input from outside, and the process control goes to Step S102. The acquired medical image includes a medical image that serves as training data, and a medical image that is used for image processing, for example, for detecting a landmark position.

At Step S102, the attention model training unit 20 performs mask processing on the acquired medical image that serves as the training data, in particular, performs mask processing on regions other than the region of interest in the medical image to generate a mask image, and the process control goes to Step S103.

At Step S103, the attention model training unit 20 trains the attention model by using the medical image, the heatmap corresponding to the medical image (the heatmap GT), and the mask image, and the process control goes to Step S104.

At Step S104, the attention acquisition unit 30 acquires the attention feature, the attention module, and the attention extraction module in the trained attention model, and the process control goes to Step S105.

At Step S105, the image processing model training unit 40 trains the image processing model by using the medical image and the attention feature in the trained attention model, and the process control goes to Step S106.

Specifically, at Step S105, the image processing model training unit 40 trains the image processing model by using the medical image, the heatmap corresponding to the medical image, and the attention feature that indicates attention of the region of interest in the trained attention model.

At Step S106, the combining unit 50 combines, as the attention image processing model, the attention extraction module in the trained attention model and the trained image processing model. Specifically, the combining unit 50 combines, as the attention image processing model, the attention extraction module including the attention module that outputs the attention feature and the trained image processing model. The training flow is terminated here and the process control goes to the processing flow at Step S107.

At Step S107, the image processing unit 60 performs processing on the medical image by using the attention image processing model, and the process control goes to Step S108.

At Step S108, the image processing unit 60 generates a heatmap for determining the landmark position in the medical image, and the process control goes to Step S109.

At Step S109, the image processing unit 60 determines, as the landmark position, a position at which a pixel with the highest value is present in the generated heatmap. Then, the flow is terminated.

Second Embodiment

Figure 6:
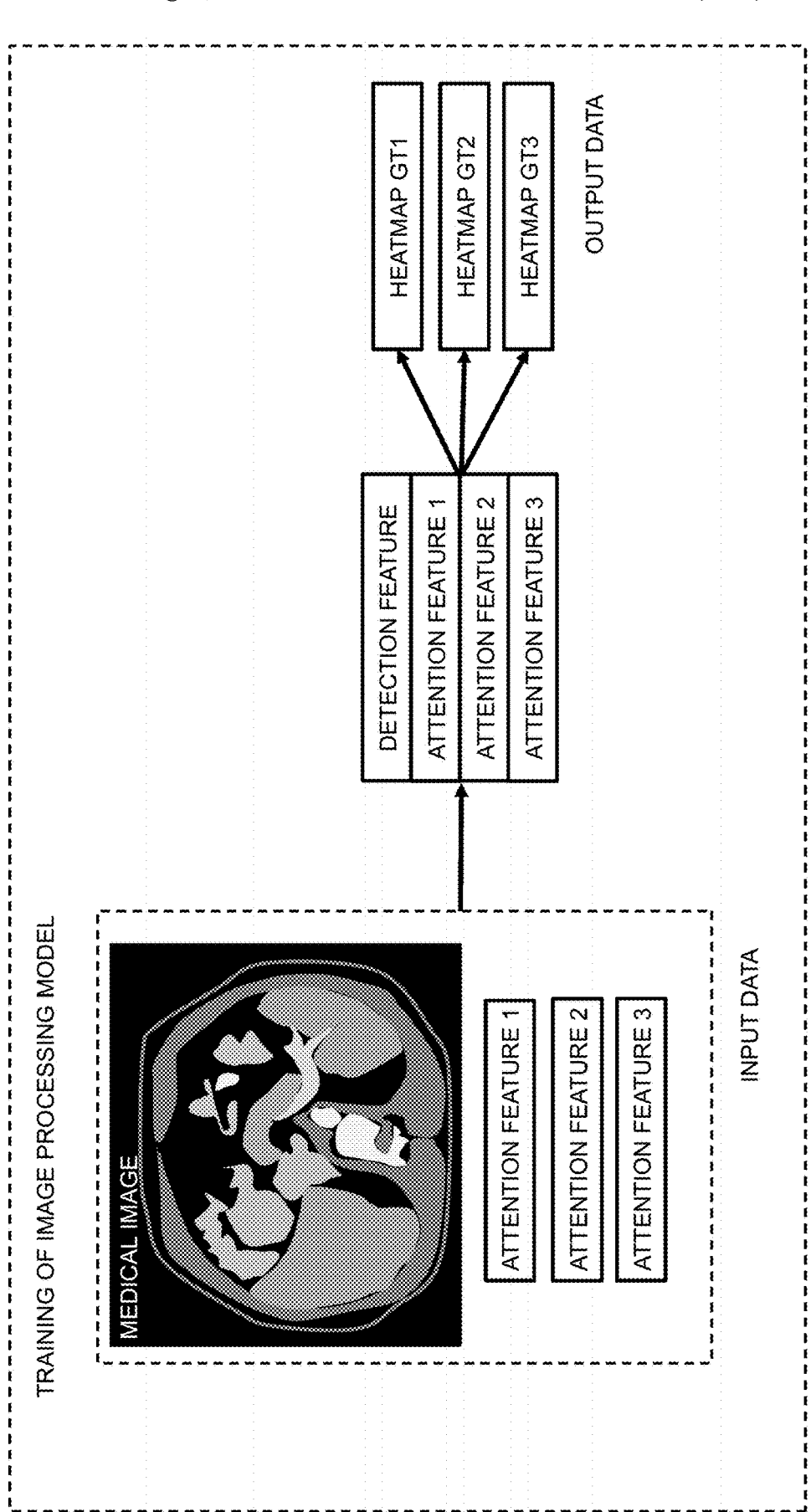
FIG. 6 is a schematic diagram illustrating training of an image processing model according to a second embodiment.

A second embodiment of the present application will be described below with reference to FIG. 6. FIG. 6 is a schematic diagram illustrating training of an image processing model in which a plurality of attention features are combined according to the second embodiment.

Further, in the description below, for example, a landmark position corresponding to a liver tail in a liver and a landmark position corresponding to a splenic tail in a spleen are detected, in addition to detection of the landmark position corresponding to the pancreatic tail in the medical image.

The medical image processing apparatus 1 of the second embodiment is the same as the first embodiment, and includes the input and output unit 10, the attention model training unit 20, the attention acquisition unit 30, the image processing model training unit 40, the combining unit 50, and the image processing unit 60.

In the following, a difference between the second embodiment and the first embodiment will be mainly explained, the same and similar components are denoted by the same reference symbols, and repeated explanation will be appropriately omitted.

In the second embodiment, the input and output unit 10 is the same as that of the first embodiment, and therefore, explanation thereof will be omitted.

The attention model training unit 20 trains the attention model by using the medical image and the mask image.

At this time, for example, the landmark positions corresponding to the pancreatic tail, the liver tail, and the splenic tail in the medical image are detected. Therefore, the attention model training unit 20 adopts each of the pancreas, the liver, and the spleen as the region of interest, performs mask processing for shielding regions other than the region of interest of each of the pancreas, the liver, and the spleen in the medical image, and generates corresponding mask images (a mask image of the pancreas, a mask image of the liver, and a mask image of the spleen).

Further, the attention model training unit 20 trains attention models with respect to the pancreas, the liver, and the spleen by using the medical image and the mask image corresponding to each of the pancreas, the liver, and the spleen. For example, the attention model training unit 20 trains the attention model with respect to the pancreas by using the medical image and the mask image of the pancreas, the attention model training unit 20 trains the attention model with respect to the liver by using the medical image and the mask image of the liver, and the attention model training unit 20 trains the attention model with respect to the spleen by using the medical image and the mask image of the spleen. In other words, for example, the attention model training unit 20 generates the attention model of the pancreas, the attention model of the liver, and the attention model of the spleen.

The attention acquisition unit 30 acquires the attention feature in each of the trained attention models. For example, the attention acquisition unit 30 acquires the attention feature of the pancreas, the attention feature of the liver, and the attention feature of the spleen (attention modules 1 to 3).

The image processing model training unit 40 trains the image processing model by using the medical image and the attention feature in each of the trained attention models.

For example, as illustrated in FIG. 5, the image processing model training unit 40 trains the image processing model by adopting the medical image, the attention feature of the pancreas, the attention feature of the liver, and the attention feature of the spleen (attention features 1 to 3) as input data, concatenating a detection feature of the image processing model, the attention feature of the pancreas, the attention feature of the liver, and the attention feature of the spleen, and adopting heatmaps (heatmaps GT1 to GT3) that are generated based on the landmark positions corresponding to the pancreatic tail, the liver tail, and the splenic tail as output data of true values. In a feature of a last single layer of the decoder module of the image processing model, head block corresponding to each of the attention feature of the pancreas, the attention feature of the liver, and the attention feature of the spleen, which are different from one another, is performed, so that the landmark positions in the pancreas, the liver, and the spleen are obtained.

Here, the head block sequentially performs multiplication and addition of corresponding elements with respect to each of the attention features and the feature of the last single layer of the image processing model. Further, the attention feature of the pancreas, the attention feature of the liver, and the attention feature of the spleen correspond to the landmark positions in the pancreas, the liver, and the spleen, respectively.

The combining unit 50 combines, as the attention image processing model, the plurality of attention extraction modules in the trained attention model and the trained image processing model.

The image processing unit 60 performs processing on the medical image by using the attention image processing model.

In this example, for example, the image processing unit 60 generates the heatmap for the landmark position in each of the pancreas, the liver, and the spleen with respect to the medical image by using the trained attention image processing model. Further, for example, the image processing unit 60 adopts a position with the highest value in the heatmap of the pancreas as the landmark position corresponding to the pancreatic tail, adopts a position with the highest value in the heatmap of the liver as the landmark position corresponding to the liver tail, and adopts a position with the highest value in the heatmap of the spleen as the landmark position corresponding to the splenic tail.

In the second embodiment, the attention model training unit 20 trains the plurality of attention models so as to correspond to a plurality of regions of interest in the medical image, the attention acquisition unit 30 acquires a plurality of attention features in the plurality of attention models, and the image processing model training unit 40 trains the image processing model such that the plurality of attention features in the plurality of attention models and the medical image are concatenated as input, the attention features and the detection feature of the image processing model are concatenated with one another, and the heatmaps of the landmarks of a plurality of combinations corresponding to the plurality of attention features are adopted as output. The image processing unit 60 performs processing on the models by using an attention image in which the plurality of attention features are combined, generates a plurality of heatmaps corresponding to the respective landmarks, and adopts a position with the highest value in each of the heatmap as the landmark position.

That is, each of the processing functions implemented by the attention model training unit 20, the attention acquisition unit 30, the image processing model training unit 40, the combining unit 50, and the image processing unit 60 is stored in a memory in the form of a computer executable program. The processing circuitry is a processor that reads programs from the memory and implements functions corresponding to each of the programs by executing the programs. In other words, the processing circuitry that has read each of the programs has each of the functions corresponding to the programs. Meanwhile, the example has been described in which the single processing circuitry implements the processing functions of the attention model training unit 20, the attention acquisition unit 30, the image processing model training unit 40, the combining unit 50, and the image processing, but it may be possible to construct the processing circuitry by a combination of a plurality of independent processors and cause each of the processors to execute the programs and implement the functions. In other words, each of the functions as described above may be configured as a program, and single processing circuitry may execute each of the programs. As another example, a specific function may be implemented by a dedicated independent program execution circuitry.

Meanwhile, the example has been described above in which the landmark position is detected in the medical image by using the attention image processing model, and the attention image processing model is adopted as a model for detecting the landmark position in the medical image; however, the medical image processing apparatus and the image processing method of the present embodiment are not limited to this example. For example, the technology is applicable to division of a region in the medical image, and in this case, the attention image processing model serves as a medical image region division model.

The components of the apparatuses of the embodiments as described above are conceptual function, and need not always be physically configured in the manner illustrated in the drawings. In other words, specific forms of distribution and integration of the apparatuses are not limited to those illustrated in the drawings, and all or part of the apparatuses may be functionally or physically distributed or integrated in arbitrary units depending on various loads or use conditions. Further, all or an arbitrary part of the processing functions implemented by the apparatuses may be realized by processing circuitry, such as a CPU, and a program analyzed and executed by the CPU, or may be realized by hardware using wired logic.

That is, each of the processing functions implemented by the attention model training unit 20, the attention acquisition unit 30, the image processing model training unit 40, the combining unit 50, and the image processing unit 60 is stored in a memory in the form of a computer executable program. The processing circuitry is a processor that reads programs from the memory and implements functions corresponding to each of the programs by executing the programs. In other words, the processing circuitry that has read each of the programs has each of the functions corresponding to the programs. Meanwhile, the example has been described in which the single processing circuitry implements the processing functions of the attention model training unit 20, the attention acquisition unit 30, the image processing model training unit 40, the combining unit 50, and the image processing, but it may be possible to construct the processing circuitry by a combination of a plurality of independent processors and cause each of the processor to execute the programs and implement the functions. In other words, each of the functions as described above may be configured as a program, and single processing circuitry may execute each of the programs. As another example, a specific function may be implemented by a dedicated independent program execution circuitry.

The "processor" described above indicates, for example, a circuit, such as a CPU, a graphical processing unit (GPU), or an application specific integrated circuit (ASIC), a programmable logic device (for example, a simple programmable logic device (SPLD), a complex programmable logic device (CPLD), and a field programmable gate array (FPGA)). The processor implements the functions by reading the programs stored in the memory and executing the programs.

Moreover, the medical image processing apparatus and the medical image processing method explained in the embodiments as described above may be implemented by causing a computer, such as a personal computer or a station, to execute a program that is prepared in advance. The program is distributed via a network, such as the Internet. Furthermore, the program is stored in a non-transitory computer readable recording medium, such as a hard disk, a floppy disk (FD), a compact disc-read only memory (CD- ROM), a magneto optical disc (MO), or a digital versatile disk (DVD), and executed by being read from the recording medium by the computer.

According to at least one embodiment described above, it is possible to determine a position of a landmark in a medical image.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical image processing apparatus comprising:
   processing circuitry configured to
   train an attention model by using a medical image and a mask image that is obtained by performing mask processing on a region other than a region of interest in the medical image,
   train an image processing model by using the medical image, a heatmap corresponding to the medical image, and an attention feature that indicates attention of the region of interest in the trained attention model,
   combine, as an attention image processing model, an attention extraction module that includes an attention module for outputting the attention feature and the trained image processing model,
   perform processing on the medical image by using the attention image processing model,
   generate a heatmap for determining a position of a landmark in the medical image,
   train a plurality of attention models so as to correspond to a plurality of organs in the medical image,
   generate a plurality of attention features corresponding to the plurality of organs,
   train the image processing model such that the medical image and the plurality of attention features corresponding to the plurality of organs are adopted as input of the image processing model, the plurality of attention features and a detection feature of the image processing model are concatenated with one another, and heatmaps of landmarks of a plurality of combinations corresponding to the plurality of attention features that correspond to the plurality of organs are adopted as output of the image processing model, and
   train the image processing model with respect to the plurality of organs by using mask images corresponding to the plurality of organs.

2. The medical image processing apparatus according to claim 1, wherein the processing circuitry is configured to acquire the attention feature, the attention module, and the attention extraction module in the trained attention model.

3. The medical image processing apparatus according to claim 1, wherein
   the processing circuitry is configured to train the image processing model such that the medical image and the attention feature are adopted as input of the image processing model, the attention feature at corresponding resolution and a detection feature of the image processing model are concatenated with each other, and a heatmap of the landmark in the medical image is adopted as output of the image processing model, and a value of each of pixels in the heatmap indicates a probability that a located position of the pixel serves as the landmark.

4. The medical image processing apparatus according to claim 3, wherein the attention extraction module includes an encoder module and the attention module in the attention model.

5. The medical image processing apparatus according to claim 4, wherein the image processing model is one of a landmark position detection model and a region division model for the medical image.

6. The medical image processing apparatus according to claim 5, wherein the medical image is an image in which a pancreas is captured, and a position of the landmark is a position of the pancreatic tail.

7. A medical image processing method comprising:

training an attention model by using a medical image and a mask image that is obtained by performing mask processing on a region other than a region of interest in the medical image;

training an image processing model by using the medical image, a heatmap corresponding to the medical image, and an attention feature that indicates attention of the region of interest in the trained attention model;

combining, as an attention image processing model, an attention extraction module that includes an attention module for outputting the attention feature and the trained image processing model;

performing processing on the medical image by using the attention image processing model;

generating a heatmap for determining a position of a landmark in the medical image;

training a plurality of attention models so as to correspond to a plurality of organs in the medical image;

generating a plurality of attention features corresponding to the plurality of organs; and training the image processing model such that the medical image and the plurality of attention features corresponding to the plurality of organs are adopted as input of the image processing model, the plurality of attention features and a detection feature of the image processing model are concatenated with one another, and heatmaps of landmarks of a plurality of combinations corresponding to the plurality of attention features that correspond to the plurality of organs are adopted as output of the image processing model, wherein the method comprising training the image processing model with respect to the plurality of organs by using mask images corresponding to the plurality of organs.

* * * * *